United States Patent
Balasubramanian et al.

(10) Patent No.: US 11,580,260 B2
(45) Date of Patent: Feb. 14, 2023

(54) DATA PROTECTION AS A SERVICE

(71) Applicant: Optum, Inc., Minnetonka, MN (US)

(72) Inventors: Vinod Anand Balasubramanian, Newington, CT (US); Rama Kulasekaran, Lakeville, MN (US); Venkatesan Subramanian, Eagan, MN (US)

(73) Assignee: OPTUM, INC., Minnetonka, MN (US)

( * ) Notice: Subject to any disclaimer, the term of this patent is extended or adjusted under 35 U.S.C. 154(b) by 265 days.

(21) Appl. No.: 17/077,571

(22) Filed: Oct. 22, 2020

(65) Prior Publication Data

US 2022/0129583 A1 Apr. 28, 2022

(51) Int. Cl.
*G06F 21/62* (2013.01)
*G06F 21/60* (2013.01)
(Continued)

(52) U.S. Cl.
CPC .......... *G06F 21/6254* (2013.01); *G06F 9/451* (2018.02); *G06F 21/604* (2013.01);
(Continued)

(58) Field of Classification Search
CPC .... G06F 21/6254; G06F 9/451; G06F 21/604; G06N 20/00; H04L 63/20; G06Q 30/02
See application file for complete search history.

(56) References Cited

U.S. PATENT DOCUMENTS 7,519,591 B2 4/2009 Landi et al.
9,087,216 B2 7/2015 LaFever et al.
(Continued)

OTHER PUBLICATIONS

"Data Protection As A Service (DPaaS)," Hitachi Vantara, (3 pages), (Online). [Retrieved from the Internet Jan. 3, 2021] <URL: https://www.hitachivantara.com/en-us/products/data-protection/dpaas.html>.

(Continued)

*Primary Examiner* — Arvin Eskandarnia
(74) *Attorney, Agent, or Firm* — Alston & Bird LLP

(57) ABSTRACT

Embodiments of the present disclosure provide methods, apparatus, systems, computing devices, and computing entities for predictive data protection using a data protection policy determination machine learning model. In one embodiment, a method is provided comprising: processing a historical data corpus using the data protection policy determination machine learning model to generate a dynamic data protection policy update describing inferred data protection instructions; determining an attestation subset of the inferred data protection instructions by comparing the instructions and prior data protection instructions described by an existing data protection policy; for each inferred data protection instruction in the attestation subset, determining a per-instruction attestation determination based on end-user feedback; generating an updated data protection policy by updating the existing policy in accordance with each inferred instruction in the attestation subset whose per-instruction attestation determination describes an affirmative attestation determination; and performing the predictive data protection using the updated data protection policy.

20 Claims, 7 Drawing Sheets

(51) Int. Cl.
*G06N 20/00* (2019.01)
*G06F 9/451* (2018.01)
*G06Q 30/02* (2023.01)
*H04L 9/40* (2022.01)

(52) U.S. Cl.
CPC ............ *G06N 20/00* (2019.01); *G06Q 30/02* (2013.01); *H04L 63/20* (2013.01)

(56) References Cited

U.S. PATENT DOCUMENTS

| | | | |
|---|---|---|---|
| 9,292,707 | B1 | 3/2016 | Fontecchio |
| 9,355,273 | B2 | 5/2016 | Stevens et al. |
| 9,547,769 | B2 * | 1/2017 | Aissi ..................... H04L 63/20 |
| 9,973,484 | B2 | 5/2018 | Reid et al. |
| 10,387,670 | B2 | 8/2019 | Hosie et al. |
| 10,600,506 | B2 | 3/2020 | Blum et al. |
| 10,607,726 | B2 | 3/2020 | Lynch et al. |
| 2017/0091391 | A1 | 3/2017 | LePendu |
| 2019/0236310 | A1 | 8/2019 | Austin et al. |
| 2020/0082922 | A1 | 3/2020 | Bacastow |
| 2021/0034602 | A1 * | 2/2021 | Levacher ............ G06F 16/2365 |
| 2021/0174089 | A1 * | 6/2021 | Rao ......................... G06V 20/46 |

OTHER PUBLICATIONS

"The Data Privacy Platform," Privitar, (4 pages), (Online). [Retrieved from the Internet Jan. 3, 2021] <URL: https://www.privitar.com/data-privacy/>.

Karpatne, Vijyendra et al. "Enhancing Security Of Data In Cloud Environment Using Data Protection As A Service (DPaaS)," European Journal of Scientific Research, vol. 147, No. 1, Sep. 2017, pp. 39-45. ISSN: 1450-216X/1450-202X. <Url: https://www.hitachivantara.com/en-us/products/data-protection/dpaas.html>.

* cited by examiner

DATA PROTECTION AS A SERVICE

BACKGROUND

Embodiments of the present disclosure generally relate to providing a framework in which various data protection processes are provided within a software as a service environment.

BRIEF SUMMARY

In general, embodiments of the present disclosure provide methods, apparatus, systems, computing devices, computing entities, and/or the like for predictive data protection using a data protection policy determination machine learning model. In accordance with one aspect of the present disclosure, a method for predictive data protection using a data protection policy determination machine learning model is provided. In various embodiments, the method comprises: processing a historical data corpus via a computing entity using the data protection policy determination machine learning model to generate a dynamic data protection policy update, wherein the dynamic data protection policy update describes one or more inferred data protection instructions; determining by the computing entity an attestation subset of the one or more inferred data protection instructions by comparing the one or more inferred data protection instructions and one or more prior data protection instructions described by an existing data protection policy; for each inferred data protection instruction of the one or more inferred data protection instructions that is in the attestation subset, determining by the computing entity a per-instruction attestation determination based on end-user feedback; generating an updated data protection policy by the computing entity updating the existing data protection policy in accordance with each inferred data protection instruction of the one or more inferred data protections that both is in the attestation subset and whose per-instruction attestation determination describes an affirmative attestation determination; and performing the predictive data protection using the updated data protection policy.

In accordance with another aspect of the present disclosure, an apparatus is provided. In various embodiments, the apparatus comprises at least one processor and at least one memory comprising computer program code. The at least one memory and the program code are configured to, with the at least one processor, cause the apparatus to: process a historical data corpus using the data protection policy determination machine learning model to generate a dynamic data protection policy update, wherein the dynamic data protection policy update describes one or more inferred data protection instructions; determine an attestation subset of the one or more inferred data protection instructions by comparing the one or more inferred data protection instructions and one or more prior data protection instructions described by an existing data protection policy; for each inferred data protection instruction of the one or more inferred data protection instructions that is in the attestation subset, determine a per-instruction attestation determination based on end-user feedback; generate an updated data protection policy by updating the existing data protection policy in accordance with each inferred data protection instruction of the one or more inferred data protections that both is in the attestation subset and whose per-instruction attestation determination describes an affirmative attestation determination, wherein the predictive data protection is performed using the updated data protection policy.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: process a historical data corpus using the data protection policy determination machine learning model to generate a dynamic data protection policy update, wherein the dynamic data protection policy update describes one or more inferred data protection instructions; determine an attestation subset of the one or more inferred data protection instructions by comparing the one or more inferred data protection instructions and one or more prior data protection instructions described by an existing data protection policy; for each inferred data protection instruction of the one or more inferred data protection instructions that is in the attestation subset, determine a per-instruction attestation determination based on end-user feedback; generate an updated data protection policy by updating the existing data protection policy in accordance with each inferred data protection instruction of the one or more inferred data protections that both is in the attestation subset and whose per-instruction attestation determination describes an affirmative attestation determination, wherein the predictive data protection is performed using the updated data protection policy.

In particular embodiments, a plurality of data protection containers are identified, wherein each data protection container of the plurality of data protection containers is associated with a computing node of a plurality of computing nodes for a computing cluster. In some of these embodiments, the updated data protection policy is provided to each computing node of the plurality of computing nodes. In addition, each computing node of the plurality of computing nodes may store a per-container execution logic for the data protection container that is associated with the computing node, a per-container policy version for the data protection container that is associated with the computing node, and a per-container policy update logic for the data protection container that is associated with the computing node. Accordingly, in some embodiments, the updated data protection policy is provided to a computing node of the plurality of computing nodes by transmitting the updated data protection policy to a communication interface that is associated with the per-container policy update logic for the data protection container that is associated with the computing node. In addition, each per-container policy update logic that is associated with a computing node of the plurality of computing nodes may be configured to update the per-container policy version that is associated with the computing node in accordance with the updated data protection policy and each per-container execution logic that is associated with a computing node of the plurality of computing nodes is configured to perform the predictive data protection with respect to the computing node using the per-container policy version that is associated with the computing node.

Further, in particular embodiments, the predictive data protection is performed with respect to a computing node of the plurality of computing nodes by receiving an input data stream, wherein the input data stream includes one or more input data entries. In some of these embodiments, for each input data entry of the one or more input data entries, the input entry is processed in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions includes one or more tokenization actions, one or more de-identification actions, and one or more security protocol tagging actions, and the predictive data protection is performed with respect to the computing node in accordance with each one or more recommended data protection actions that is associated with an input data entry of the one or more input data entries.

Furthermore, in particular embodiments, the predictive data protection is performed with respect to a computing node of the plurality of computing nodes by receiving an input application programming interface call, wherein the input application programming interface call includes one or more input data entries. In some of these embodiments, for each input data entry of the one or more input data entries, the input entry is processed in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions includes one or more tokenization actions, one or more de-identification actions, and one or more security protocol tagging actions, and the predictive data protection is performed with respect to the computing node in accordance with each one or more recommended data protection actions that is associated with an input data entry of the one or more input data entries.

Finally, in some embodiments, the per-instruction attestation determination is determined for an inferred data protection instruction of the one or more inferred data protection instructions that is in the attestation subset by generating an attestation user interface that is configured to describe the inferred data protection instruction, wherein the attestation user interface is configured to receive the end-user feedback, causing the attestation user interface to be displayed on a user computing device, in response to causing the attestation user interface to be displayed on a user computing device, receiving the end-user feedback from the user computing device, and determining the per-instruction attestation based on the end-user feedback. In some embodiments, the predictive data protection is performed by receiving an input data stream, wherein the input data stream includes one or more input data entries, for each input data entry of the one or more input data entries, processing the input entry in accordance with the updated data protection policy to determine one or more recommended data protection actions for the input data entry, wherein: (i) the one or more recommended data protection actions are selected from a plurality of candidate data protection actions, and (ii) the plurality of candidate data protection actions includes one or more tokenization actions, one or more de-identification actions, and one or more security protocol tagging actions, and performing the predictive data protection in accordance with each one or more recommended data protection actions that is associated with an input data entry of the one or more input data entries. In some embodiments, the predictive data protection is performed by receiving an input application programming interface call, wherein the input application programming interface call includes one or more input data entries, for each input data entry of the one or more input data entries, processing the input entry in accordance with the updated data protection policy to determine one or more recommended data protection actions for the input data entry, wherein: (i) the one or more recommended data protection actions are selected from a plurality of candidate data protection actions, and (ii) the plurality of candidate data protection actions includes one or more tokenization actions, one or more de-identification actions, and one or more security protocol tagging actions, and performing the predictive data protection in accordance with each one or more recommended data protection actions that is associated with an input data entry of the one or more input data entries.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
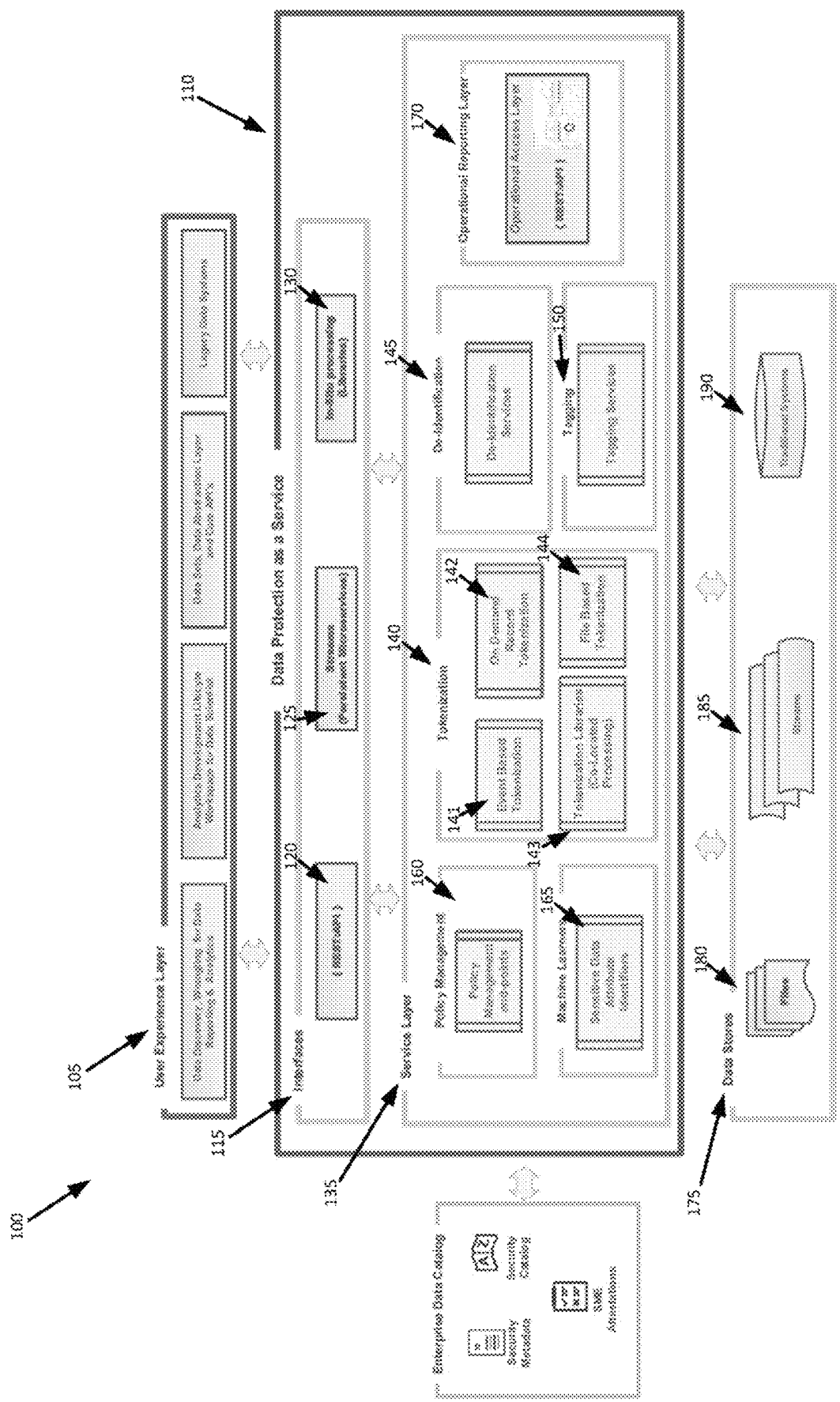
FIG. 1 is an overview of a data protection as a service framework in accordance with various embodiments of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "data entry" may refer to a specific data object found in a collection of data to be processed in accordance with various embodiments of the disclosure. For example, a table found in a database may represent a collection of data and a data entry may represent the information stored in a specific field of the table. In another example, a file containing text may represent a collection of data and a data entry may represent a particular word found in the text of the file. In some instances, a data entry may be referred to as an attribute of the collection of data.

The term "historical data corpus" may refer to a data object having a collection of historical data in which data entries of the historical data may be subject to one or more data protection requirements. For example, protected health information (PHI) under U.S. law is any information involving health status, provision of health care, or payment for health care that is created or collected by a covered entity and can be linked to a specific individual. Oftentimes such information is considered confidential data and covered entities handling such information are required to keep the information confidential under regulations and/or compliance and privacy laws. Therefore, such entities may be required under these regulations and/or compliance and privacy laws to carry out one or more actions on such data to ensure the protection of an individual's privacy while handling the data. As discussed further herein, a historical data corpus may be used in particular embodiments to identify those data entries (e.g., attributes) found in a set of data that may be considered sensitive and therefore, subject to one or more data protection actions.

The term "data protection policy determination machine learning model" may refer to a data object that describes parameters and/or hyper-parameters (e.g., defined operations) of a machine learning model that is configured to process a historical data corpus to identify a dynamic data protection policy update with respect to one or more data entries found in the corpus that represent sensitive data. Accordingly, the term "dynamic data protection policy update" may refer to a data object having one or more inferred data protection instructions.

The term "inferred data protection instruction" may refer to a data object that provides a recommendation of one or more data protection action(s) that should be taken with respect to a data entry identified by the model in the corpus representing sensitive data. For example, in particular embodiments, the data protection policy determination machine learning model may process a corpus and identify that the corpus includes a data entry involving individuals' social security numbers. Therefore, in this example, an inferred data protection instruction may recommend one or more data protection actions to carry out on the data entry to prevent individuals' social security numbers from being exposed.

The term "data protection policy" may refer to a data object that provides instructions that are to be performed on one or more data entries representing sensitive data found in a collection of data to protect the sensitive data found in entries in some manner. For instance, in some embodiments, a data protection policy may be associated with a particular topic defined by a client. For example, a client may have one or more fields in a database table storing sensitive data that need to be protected. Here, the client may define a data protection policy for the database table (e.g., a topic) and in turn, the data protection policy may define one or more instructions identifying the fields found in the database table containing the sensitive data (e.g., data entries), the protection actions to be carried out on the fields (e.g., tokenization), and when the protection actions are to be carried out on the fields.

The term "data protection instruction" may refer to a data object representing a direction found in a data protection policy for protecting a data entry representing sensitive data for a specific topic. As noted, in various embodiments, a data protection instruction may identify one or more data entries containing sensitive data that are to be protected for a collection of data, one or more actions to be carried out on the entries to protect the sensitive data, and/or when the actions are to be carried out on the entries. For example, a particular data protection policy may be established for a table found in a database storing sensitive data. Here, a data protection instruction may be defined in the policy for a field (e.g., a data entry) storing social security numbers in the table. Accordingly, this instruction may identify the field in the table used to store the social security numbers, the action(s) to be carried out to protect the social security numbers such as, for example, tokenization, tagging, and/or de-identification, and when to carry out the action(s) such as when a social security is received from an individual and is to be written to the table.

The term "attestation subset" may refer to a data object that provides an example of one or more data entries gathered from a corpus that have been identified as representing sensitive data and should potentially be protected. Here, in particular embodiments, the attestation subset may include one or more inferred data protection instructions for protecting the data entries identified in the corpus representing sensitive data. In addition, in particular embodiments, the attestation subset may be provided to a stakeholder (e.g., subject matter expert) for the corpus who may then provide feedback on whether an existing data protection policy should be updated with respect to protecting the data entries identified as sensitive data. For instance, the stakeholder may provide feedback as to whether or not the existing data protection policy should be updated to incorporate the one or more inferred data protection instructions.

The term "per-instruction attestation determination" may refer to a conclusion on whether an existing data protection policy should be updated in a particular manner to incorporate an inferred data protection instruction, where the particular manner is described by the corresponding data inferred data protection instruction. In some embodiments, each per-instruction attestation determination is generated based on end-user feedback, such as end-user feedback confirming or denying the corresponding data protection instruction that is associated with the per-instruction attestation determination.

The term "data protection container" may refer to a data object that includes an entire runtime environment of a data protection service as described herein for various embodiments. For instance, in particular embodiments, a data protection container for a data protection service includes the runtime environment for the service, plus the service's dependences, libraries and other binaries, and configuration files needed to run the service, bundled into one package. As discussed in further detail herein, in some embodiments, one or more data protection containers may be provided over one or more computing nodes of a computing cluster to facilitate supporting various clients with data protection services.

The term "per-container policy version" may refer to a data object representing a data protection policy that is a part of the runtime environment for a data protection container. Accordingly, in various embodiments, the data protection service provided by the container can be executed using the per-container policy version of the data protection policy without a need for making any external calls or references with respect to the instructions found within the data protection policy.

The term "per-container execution logic" may refer to instructions, operations, structure, design, and/or the like associated with a particular data protection container used in performing predictive data protection on one or more data entries based on a per-container policy version of a data protection policy. For instance, in particular embodiments, the per-container execution logic may be configured as one or more microservices provided within a data protection container. Here, a microservice may be configured to perform one or more aspects of predictive data protection operations such as, for example, tokenizing, tagging, de-identifying, and/or the like of data entries found in a collection of data.

The term "per-container policy update logic" may refer to instructions, operations, structure, design, and/or the like associated with a particular data protection container used in updating a per-container policy version associated with the container based on an updated data protection policy. In some embodiments, the per-container policy update logic may retrieve latest policy updates and use those to update the per-container execution logic.

The term "input data stream" may refer to a sequence of digitally encoded coherent signals (e.g., data packets) used to transmit a collection of data. In particular embodiments, an input data stream may include one or more input data entries within the collection of data that are subject to one or more data protection policies and therefore, subject to one or more data protection instructions to be carried out by one or more data protection services as described herein.

The term "input application programming interface call" may refer to a data object representing a request received from a client, where the request involves performing one or more data protection services on one or more data entries. Here, depending on the circumstances, the call may be received in a number of different formats. For example, an input application programming interface call may be received as a request in a batch format involving performing data protection services on one or more data entries found in one or more files. While in other instances, an input application programming interface call may be received as a request in an on demand format involving performing data protection services on one or more specific data entries.

Exemplary Technical Contributions

Various embodiments of the present disclosure address technical problems related to providing a number of different data protection services within a common framework. Conventionally, many organizations (as well as many groups within organizations) are oftentimes required to secure their own data. As a result, data protection practices over an organization can involve a mishmash of data protection processing being used that can lead to redundant systems and infrastructure. For example, separate groups within an organization may need to perform a common data protection process (e.g., tagging) for a collection of data that each group is using within its own operations. Here, each of the separate groups may be required to implement and manage its own data protection system and/or infrastructure to perform the common data protection process. This can lead to redundant systems and/or infrastructure, resulting in many inefficiencies with respect to protecting data within an organization as well as higher cost and ineffective use of system resources. Furthermore, the lack of a standardized, secure framework and structure for performing data protection throughout the organization can lead to the organization's vulnerability to internal and external data breaches.

Thus, various embodiments of the present disclosure overcome many of these noted challenges by facilitating a data protection framework provided as a software as a service to enable multiple parties (e.g., groups within an organization) to have access to a suite of data protection services that provides consistent security and governance practices on various types of data uses. In addition, the framework provided in various embodiments implement the integration of different components (e.g., the ability to discover, identify, classify, and enforce) for data protection capabilities with uniform interfaces to help future proof clients from changes in technology. Furthermore, the framework of various embodiments provides a flexibility to switch between different technologies to perform any number of different data protection capabilities.

Therefore, the disclosed solution provided herein is more effective, efficient, timely, accurate, and faster in protecting data for organizations than conventional practices, systems, and infrastructures used in many industries today. Further, the incorporation of artificial intelligence (AI) through the use of machine learning model(s) in various embodiments allows for complex mathematical operations to be carried out that cannot be feasibly performed by a human. For example, various embodiments of the disclosure involve the use of AI to identify attributes representing sensitive data in large corpora of data, in a manner that could not normally be performed by a human. This is especially the case when such operations need to be performed in a short timeframe that allows for organizations to perform data protection processes on data in a timely manner and to do so in a manner that minimizes the exposure of sensitive data. In doing so, various embodiments of the present disclosure make major technical contributions to improving the computational efficiency and reliability of protecting sensitive data used by many organizations. This in turn translates to more secure and more computationally efficient software systems.

Brief Overview of a Framework for Various Embodiments

Turning now to FIG. 1, an overview is now described of a framework 100 for providing data protection as a service (DPaaS 110) according to various embodiments of the disclosure. Here, one or more client systems interface with the DPaaS 110 through a user experience layer 105. As described further herein, these client systems may use data for various purposes and have different data entries (e.g., attributes) that are considered to represent sensitive data.

For example, one of the clients may be a health insurance provider who handles personal health information (PHI) for various customers in processing health insurance claims. Therefore, the health insurance provider may be subject to different regulatory compliance laws and/or contractual agreements regarding the use of the PHI that requires the health insurance provider to handle the PHI in a secure manner. Therefore, the health insurance provider may need to perform one or more security measures with respect to the PHI to ensure the PHI is used and/or stored within the health insurance provider's various systems while maintaining confidentiality of the PHI.

Accordingly, the health insurance provider may have one or more data platforms, services, systems, and/or the like that make use of the DPaaS 110. That is to say, the health insurance provider may be considered a consumer of the DPaaS 110. Depending on the embodiment, the DPaaS 110 may be provided as an internal service to the health insurance provider such as, for example, through an on-premise implementation, or as an external service such as, for example, through a public cloud implementation. As noted, the health insurance provider may have several platforms, services, systems, and/or the like that may need to use the DPaaS 110. Typically, these different platforms, services, systems, and/or the like may be responsible for conducting their own data protection solutions to secure sensitive data they are using and as a result, the health insurance provider may be required to develop and maintain a number of different protection processes and/or compliance systems across the different platforms, services, systems, and/or the like. However, the health insurance provider's use of the DPaaS 110 in particular embodiments can result in providing the different platforms, services, systems, and/or the like for the provider with uniformity in securing sensitive data.

In various embodiments, the framework 100 of the DPaaS 110 supports different types of interfaces 115 for receiving requests for services and/or data for servicing from the different clients (e.g., client systems). For instance, in some embodiments, the interfaces 115 may include one or more representational state transfer (REST) application programming interfaces (APIs) 120 that allow for clients to use the DPaaS 110 over a network such as the Internet (e.g., as a Web service). For instance, in particular instances, an application for a client may make use of a REST API 120 to perform an input application programming interface call that may include one or more input data entries requiring data protection involving one or more actions to be performed on the entries to protect the sensitive data found in the entries.

For instance, in particular embodiments, the call may involve an on-demand request that provides the one or more data entries and identifies one or more data protection policies to apply to the data entries. For example, the application performing the operations related to transmitting the input application programming interface call may be associated with a merchant's website used for selling products. Here, the application may be configured to process a purchase and receive a credit card number entered by the buyer on the website for the purchase. Here, the merchant may wish to store the credit card number for the user so that the user will not need to re-enter the credit card number during future visits. Therefore, in this example, the merchant may need to ensure that the credit card number is stored in a secure manner and the application submits an on-demand request along with the credit card number and applicable data protection policy to have data protection performed on the credit card number so that it can be stored securely.

While in other instances, the input application programming interface call may involve a batch request such as, for example, a system submitting one or more files having one or more data entries requiring data protection to be performed on the data entries. Therefore, in these instances, the call may include the one or more files and identify one or more data protection policies to apply to the files. Accordingly, the DPaaS 110 may return the results of performing data protection on the data entries using a REST API 120 as well in various embodiments.

In addition to REST APIs 120, the interfaces 115 may also include one or more streaming interfaces 125 for consuming streams of data and performing data protection on the stream in near real time. As discussed in further detail herein, the DPaaS 110 may be configured in particular embodiments to consume the data stream, perform data protection on various data entities found in the stream, and then rewrite the protected entities back to a new data stream that is consumed by the client.

Furthermore, in particular embodiments, the interfaces 115 may include one or more co-location processing (e.g., internal processing) interfaces referred to herein as in-situ processing interfaces 130 that enable a client to perform data protection processing on data entities internally within the client's own virtual area. In these particular embodiments, a client may be provided with a library of binaries that can be placed into the client's data pipeline and used to perform data protection on various data entities found in a collection of data. For instance, the library may include binaries for different programming languages such as C, Java, Go, and/or the like. As a result, the client is not required to make any type of external calls to the DPaaS 110 to perform data protection, as the DPaaS 110 is configured to use predictive data analysis techniques to efficiently and reliably infer data protection guidelines and use those data protection guidelines to make updates to presented/stored data items upon receiving data retrieval requests and/or data modification requests. Other types of interfaces may be used in various embodiments as those of ordinary skill in the art can envision in light of this disclosure.

Accordingly, the service layer 135 of the framework 100 in various embodiments contains various data protection services that can be performed on data entities provided by clients. For example, in particular embodiments, the service layer 135 may include a tokenization service 140. Tokenization involves protecting data with non-sensitive substitutes, referred to as "tokens." For instance, tokenization may involve substituting sensitive data with a non-sensitive alphanumeric value. As a result, an unauthorized individual who may manage to access the tokenized data is not able to access the underlying information (sensitive data). Oftentimes, the token serves as a reference (e.g., identifier) that maps back to the sensitive data through a tokenization system. Therefore, tokenization oftentimes allows for the recovery of sensitive data that has been tokenized.

In addition, the service layer 135 may include a de-identification service 145. De-identification involves deleting, masking, replacing, and/or the like sensitive data. For example, de-identification may involve replacing a patient's name in a medical record with a generic name such as John Smith. De-identification is typically used to remove personal identification information from data so that an individual's privacy can be maintained if the data where to be viewed by others. This data protection process is often used on data that may be used for research and development where the non-identification information is vital in conducting the research and development.

Further, the service layer 135 may include a tagging service 150. In general, tagging is assigning a keyword or term to a data entry that can then be used to describe the entry. In many instances, tagging can be used in locating the data entry by using the "tag" as metadata that can be searched. However, a tag can also serve as metadata for implementing access control to the data entry at a data access point. For example, tagging can used to implement employee restrictions and/or line of business restrictions to specific types of data.

As discussed further herein, the DPaaS 110 is provided in various embodiments using a container configuration. A "container" is a stand-alone, all-in-one package for a software application (e.g., a service). Containers include the application binaries, plus the software dependencies and the hardware requirements need to run, all wrapped up into an independent, self-contained unit. Thus, a container can be dropped into a system, and then run using the local hardware and operating system.

Oftentimes, an application will be broken down into what is termed "microservices" to run more efficiently when the application is large and complex. Thus, in various embodiments, the DPaaS 110 utilizes a container configuration for microservices. Here, each microservice (specific service) can be packaged into a separate container. Although multiple services can be placed in a single container in some instances. Each container includes the final code binaries for the individual service, in addition to the dependencies for the service such as the libraries and APIs. Since each container only includes the dependencies it needs for the service, the microservice approach allows each container to be specialized for its service.

Therefore, looking at various embodiments of the DPaaS 110, the DPaaS 110 can be broken down into containerized microservices for the various data protection services provided. For instance, in particular embodiments, each of the data protection services may include different modules for the various interfaces 115 used by clients in making requests to the DPaaS 110. For example, looking at the tokenization service 140 in FIG. 1, this tokenization service 140 may include an event-based tokenization module 141, on-demand record tokenization module 142, a tokenization libraries module 143 for co-located processing, and a file-based tokenization module 144. Accordingly, each of these modules 141, 142, 143, 144 may be configured as a separate containerized microservice to accommodate the different types of interfaces 115 provided for client use. Specifically, the event-based tokenization module 141 may be configured to handle data entries received via a streaming interface 125 that is to be tokenized. Likewise, the on-demand record tokenization module 142 may be configured to handle data entries received via a REST API 120 for on-demand requests, while the file-based tokenization module 144 may be configured to handle data entries received via a REST API 120 for batch requests that are to be tokenized. Similarly, the tokenization libraries module 143 may be configured to handle data entries received via an in-situ processing interface 130 that is to be tokenized. A similar configuration of modules may be provided as microservices for the de-identification service 145 and the tagging service 150. Therefore, in various embodiments, the DPaaS 110 can be viewed as an enterprise suite of services. Accordingly, those of ordinary skill in the art can envision other protection services that may be provided through the DPaaS 110 in light of this disclosure in addition to (or instead of) tokenization, de-identification, and tagging.

A container does not typically know where its data comes from, nor where it is going. That is to say, a container generally is configured to access external data, work on the data, and then save out the results of the work outside of the container environment. Therefore, in various embodiments, the framework 100 may make use of a messaging system, such as Kafka, ActiveMQ, RabbitMQ, Apache Spark, Redis, and/or the like, to pass data between the DPaaS 110 (e.g., the different microservices within the DPaaS 110) and the interfaces 115. For instance, in those embodiments using a Kafka messaging system, a client who is making use of the DPaaS 110 may define different topics for categories of data that are to be protected.

For example, a client may have different data entities found in tables of a database that need to be protected. In this example, the number of tables containing such data entities may be twenty different tables. Therefore, the client may have twenty different topics defined, one for each table. The client may read a specific record that is to be written to a table that includes one or more data entities that need to be protected and may place the record (or the data entries) into the corresponding topic for the table via the appropriate interface. In turn, the microservice that is to perform the data protection on the entities for the record may then read the record (or data entries) from the topic found in the messaging system. As discussed further herein, the results of protecting the data entities in the record (e.g., a modified record) may then be written out by the microservice to a data store. Accordingly, this data store may involve a different topic from which the client retrieves the record so that the record can be written to the table in the database.

It should be understood that in some embodiments, other mechanisms for communication may be used in lieu of a messaging system. For instance, in particular embodiments, the REST API 120 may receive a batch request involving a file having one or more data entities that one or more data protection actions are to be carried out on. In this example, the REST API 120 may not necessarily make use of a messaging system to communicate the file to the appropriate microservice but may instead simply place the file in a location (e.g., cloud storage) from which the microservice reads the file from and then returns the file to so that the client may retrieve the protected file. Those of ordinary skill in the art can envision other mechanisms that may be used for communicating between the interfaces 115 and different services 140, 145, 150 of the DPaaS 110 in light of this disclosure.

Continuing on, the DPaaS 110 includes a policy management module 160 that is configured in various embodiments to manage different data protection policies for clients. For example, the different data protection policies may be stored within a repository managed by the module 160. In general, a data protection policy includes one or more instructions to be carried out on data entries received from a client to perform one or more types of data protection on the data entries. In particular embodiments, an instruction identifies one or more data entries to be protected for a particular collection of data, the type of data protection (e.g., actions) to be carried out on the entries (e.g., tokenization, de-identification, tagging, etc.), and/or the timing for carrying out the actions on the entries. Therefore, in particular embodiments, when a data entry is received in which one or more data protection processes are to be carried out on the data entry, the data entry (e.g., metadata for the data entry) and/or some other mechanism (e.g., the topic the data entry is placed into) identifies the applicable policy for the data entry.

For example, a client may transmit as a stream a data record that is to be inserted into a table found in a database that includes a social security number that needs to be protected. In this example, the client may use a streaming interface 125 to place the record (or the social security number) in the appropriate topic to have the social security number protected. Here, the topic may be associated with a particular policy that includes an instruction identifying the social security number as the attribute to be protected in the data entry and the particular action that is to be carried out on the security number is tokenization using a reversible cryptographic token. Therefore, the event-based tokenization module 141 may use the policy to perform tokenization on the security number as specified by the instruction in the policy.

In addition to the policy management module 160, the DPaaS 110 may include a sensitive data discovery module 165 in some embodiments. In these particular embodiments, the sensitive data discovery module 165 may make use of a data protection policy determination machine learning model configured to identify sensitive data entries within a collection of data (e.g., a historical data corpus) for a client. In turn, the sensitive data discovery module 165 in some embodiments may provide one or more inferred data protection instructions to the client (e.g., data owner) with respect to the identified sensitive data entries through a stewardship process to inquire as to whether the client would like to modify an existing data protection policy so that the sensitive data entries are protected.

Accordingly, in particular embodiments, the data protection policy determination machine learning model may be a machine learning model configured to infer a particular data entry found in a historical data corpus represents sensitive data. For example, the data protection policy determination machine learning model may be configured to infer that a credit card number found in a historical data corpus represents sensitive data. For example, the data protection policy determination machine learning model may be a deep learning module such as a multilayer perception neural network, a convolutional neural network, a recurrent neural network, and/or the like. Accordingly, depending on the embodiment, the data protection policy determination machine learning model may be configured to process the entire corpus, a portion thereof, or individual entries found within the corpus as input to identify those entries found within the corpus representing sensitive data. Thus, in some embodiments, the data protection policy determination machine learning model may be a trained machine learning model that is configured to process a historical data corpus. For example, the trained machine learning model may be configured, in part, to process the corpus, portion thereof, or individual entities found in the corpus to generate a prediction (e.g., confidence score) about whether one or more data entries (e.g., attributes) found within the corpus represent sensitive data.

As discussed further herein, the sensitive data discovery module 165 may then identify one or more data protection policies associated with the corpus in various embodiments and evaluate the policies to determine whether the policies address the identified sensitive data entries. Accordingly, this may involve the sensitive data discovery module 165 first determining what actions should be carried out with respect to protecting each of the sensitive data entries and then determining what policies may be applicable. The module 165 may then determine whether the policies already address the actions (e.g., include instructions for the actions) with respect to the identified sensitive data entries. If not, then the sensitive data discovery module 165 may invoke a stewardship process to inquire the client as to whether the applicable policies should be modified to include one or more inferred data protection instructions to address protecting the identified sensitive data entries. Here, the stewardship process may involve, for example, presenting the inferred data protection instructions along with examples of the identified sensitive data entries (e.g., attestation subset) to the client though some type of interface (e.g., graphical user interface) and receiving feedback from the client as to whether the instructions should be implemented within the applicable policies.

Thus, in various embodiments, the sensitive data discovery module 165 may make an attestation determination for each inferred instruction provided in the attestation subset based on the client's feedback for the instruction and update the applicable data protection policy accordingly. As a result, the updated data protection policy is then deployed throughout the service layer 135 of the DPaaS 110. Here, in particular embodiments in which the different data protection services are provided as separate microservices in individual containers, each container may include a version of the different data protection policies. Therefore, in these embodiments, the sensitive data discovery module 165 may propagate the updated data protection policy so that the version of the data protection policies for each container may be replaced and/or updated to reflect the updated data protection policy.

Return now to FIG. 1, the service layer 135 may also include an operational reporting layer 170 in various embodiments to provide reporting functionality about operations and/or configurations of DPaaS 110. For instance, in particular embodiments, the operational reporting layer 170 may allow clients to collect performance metrics with respect to using the DPaaS 110 such as, for example, the availability of the service, volume of data (e.g., how many records) that has been protected over a time period, what type of protection was carried out on the data, what data protection policies were used/involved in protecting the data, what updates have been made to policies, and/or the like. In addition, the operational reporting layer 170 may provide information on operational procedures carried out by the DPaaS 110 such as, for example, what clients invoked the DPaaS 110, what services within the DPaaS 110 were invoked, when were the services invoked, and/or the like.

Finally, the framework 100 shown in FIG. 1 may include one or more data stores 175 that are used in various embodiments to store the collections of data once data protection has been carried out on the appropriate data entries found in the collections provided by clients. Accordingly, different data stores 175 may be used based on the type of data (e.g., the format the data) that was provided by the client to the DPaaS 110. For example, a client may have provided a collection of data in a file format and as a result, the DPaaS 110 may provide the protected data back in the noted file format 180. Depending on the embodiment, the file may be provided to the client in a number of different ways such as by placing the file in a secure location within a cloud environment that allows the client to retrieve the file. In other instances where the data is provided in a stream, the DPaaS 110 may provide the protected data back in a new stream 185 that is transmitted to the client. Finally, in other instances, the DPaaS 110 may provide the data back using a traditional system 190 such as, for example a REST API, Simple Object Access Protocol (SOAP) API, Extensible Mark-up Language (XML)-Remote Procedure Call (RPC) API, JavaScript Object Notation (JSON)-RPC API, and/or the like.

As mentioned, the DPaaS 110 can be viewed in various embodiments as an enterprise suite of services for providing consistent security and data protection practices on many types of data uses for a number of different clients (internally and/or externally). For instance, in various embodiments, the DPaaS 110 may provide: the ability to discover, identify, and protect sensitive data entities; the ability to catalogue sensitive data entities by integrating a centralized enterprise data catalogue; the ability to manage, define, and enforce policies with respect to sensitive data entities; the ability to track and govern data asset protection (e.g., what is protected, who is to protect it, when to protect, etc.); an architecture that may be deployed on-premise and/or the cloud; the ability to protect data for both batch processing and near real time processing; DPaaS gateway that abstracts its implementation with uniform interfaces to help future proof clients from changes in technology; the ability to create a pluggable service that simplifies the ability to switch between different tools and technologies; and/or a shared oversight model with privacy to ensure the intended result is achieved in compliance with internal and/or regulatory requirements. Further discussion is now provided with respect to different aspects of various embodiments of the disclosure.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

A networked cluster of computers is oftentimes used to increase the performance of computing applications by distributing the computational workload of the applications across the duster. A physical networked cluster of computers is often referred to as a "cloud" or "cloud infrastructure." Accordingly, cloud computing can facilitate on-demand access to resources that may be rapidly scaled up or down in proportion to user requirements.

Depending on the configuration, clouds may be public and/or private. For example, publicly, available clouds or "public clouds," may be accessed programmatically (e.g. using Application Programming Interfaces (APIs), System Development Kits (SDKs), Web Services, and/or the like) over the Internet and may be made available by providers to clients. On the other hand, organizations may have private clouds for use by employees or clients within an enterprise's data center and/or may use a hybrid cloud, which may be a combination of public-private clouds to deploy and run applications.

As previously noted, various embodiments of the disclosure involve deploying a DPaaS 110 on a host infrastructure in the form of "containers" over a duster. Although those of ordinary skill in the art should understand that other design approaches may be used in other embodiments in light of this disclosure. In general, containers typically include an entire runtime environment of an application, plus the application's dependences, libraries and other binaries, and configuration files needed to run the application, bundled into one package. Containers are often less resource intensive than other forms of deployment such as virtual machines. Further, containerization can allow for greater modularity. Rather than run an entire complex application inside a single container, the application can be split into modules. As already noted, using such a configuration is referred to as a microservices approach. Accordingly, changes can be made to the microservices without having to rebuild the entire application. In addition, individual microservices can be instantiated only when they are needed and are available almost immediately.

Container/container cluster deployment can be simplified by delivering containers or a container cluster as a service. In general, container as a service (CaaS) refers to container-based infrastructure services involving the delivery of container cluster management, container orchestration, and the underlying computational resources to end-users as a service (e.g. from a cloud infrastructure provider). In various embodiments, a plurality of nodes (e.g., servers) in a distributed cluster is used as a live environment for the DPaaS 110. This allows microservices to run in their containers, safe from disturbance from the other microservices, pulling resources when needed and releasing them when not needed. Accordingly, in particular embodiments, each microservice can be scaled by spinning up multiple instances of the container image for the service and distributing them across the cluster to various nodes to provide high availability for the DPaaS 110.

In particular embodiments, each container includes a single service (microservice) for the DPaaS 110, although multiple services may be provided within a single container in some instances. As a result, cloning and launching new copies of a container can take just seconds in some embodiments and thus, several copies of a microservice can be spread across the cluster with each copy performing the work sent to it and returning results independent of the other copies. In addition, a microservices architecture may allow each underlying microservice to be independently developed, deployed, updated, and scaled. Further, the functionality of a microservice can often be focused to allow its use with multiple services. Furthermore, microservices can often allow for development using the most appropriate programming language and/or technology for each microservice.

Figure 2:
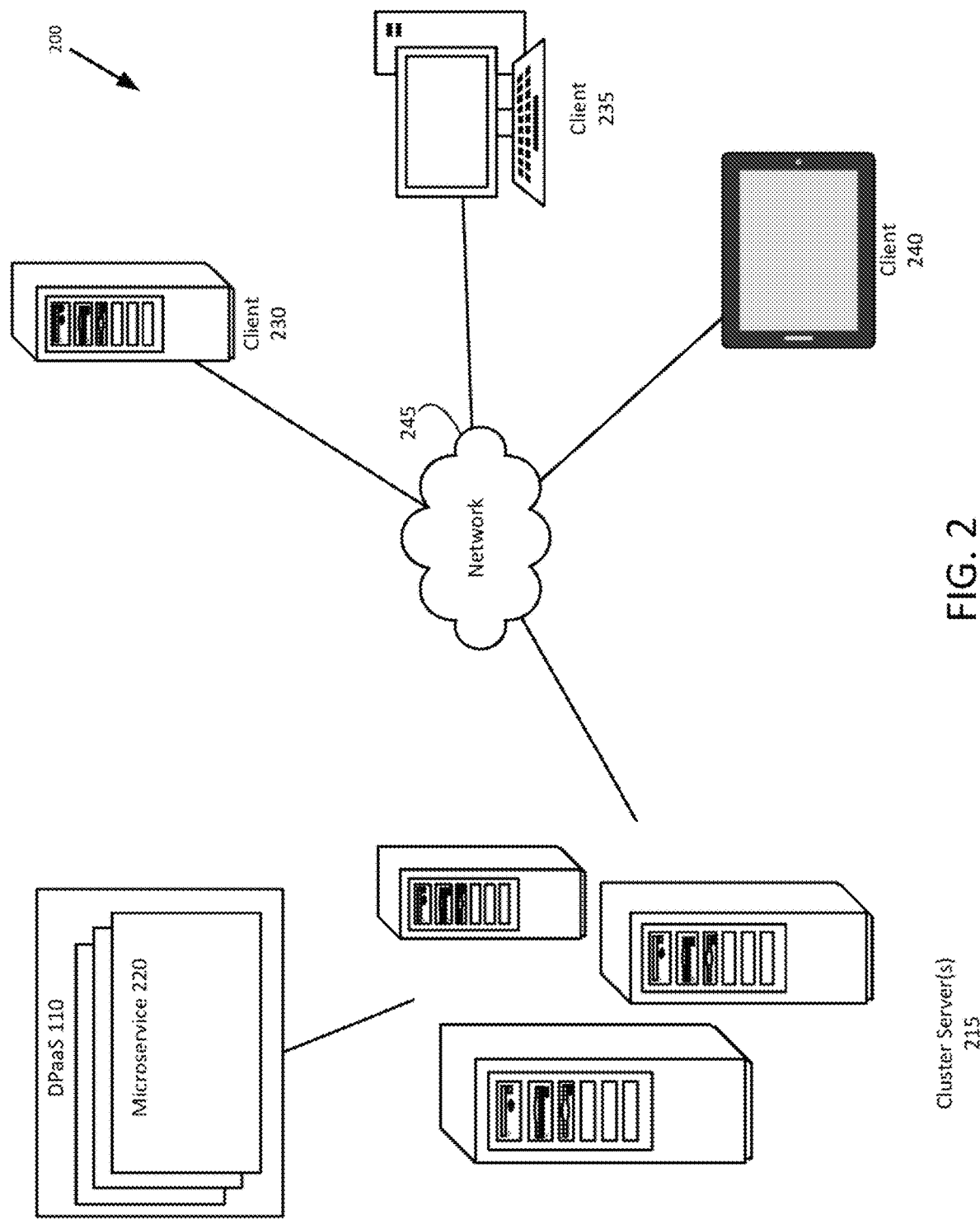
FIG. 2 is a diagram of a computer system architecture that can be used in conjunction with various embodiments of the present disclosure.

Thus, turning now to FIG. 2, this figure provides a schematic diagram of an example system architecture 200 that may be used in accordance with various embodiments of the present disclosure. Here, the system architecture 200 includes the DPaaS 110 hosted on one or more cluster servers 215 (nodes), along with other hardware and software computing elements. In some implementations, functionality of the various illustrated components, and other associated systems and tools, may be combined or even further divided and implemented among multiple different systems.

As noted, the microservices 220 are implemented in various embodiments using one or more containers such as, for example, Docker containers, Open Container initiative (OCI) based containers, and/or the like, that are hosted on the same or various different clusters within the system architecture 200. Here, a container may package a particular microservice 220 with resources corresponding to dependencies of the microservice 220 to enable the microservice 220 to run in potentially any environment or infrastructure. For example, a container may package everything required to run a particular microservice 220, such as the code, software libraries (e.g., binaries), configuration, files, runtime environment, and any other associated tools or applications. In addition, one or more of the containers may share a host operating system, as well as share corresponding binaries and/or libraries.

Accordingly, a container-orchestration system may be used in automating the orchestration of the different containers. For example, in particular embodiments, Kubernetes may be used to deploy, scale, manage, monitor, and/or upgrade individual containerized microservices within the DPaaS 110. Kubernetes creates the runtime environment, requests needed resources, handles launching services, and provides services with Internet Protocol (IP) addresses. Kubernetes can also scale the containers across the cluster and monitor the copies of each microservice 220 that are up and running to ensure work is evenly distributed across the cluster. In addition, if a container experiences a failure and goes down, Kubernetes can launch a new copy if needed. The same can be said with respect to a server 215 found within the cluster. If a server 215 fails, Kubernetes can redeploy to other nodes within the cluster.

In various embodiments, the different microservices 220 found within the DPaaS 110 also need to communicate with one another. Therefore, in these embodiments, Kubernetes can create a service within itself to enable the different microservices 220 to communicate. This communication service determines which containers can use the service based on container having the proper label and defines a port that can be used by any container with that label. Accordingly, each instance of a microservice 220 can use the same port to communicate with other microservices 220 and/or with other services on the cluster.

Clients (e.g., consumers) may interact with the DPaaS 110 using different types of client devices 230, 235, 240. For example, client devices 230, 235, 240 may include systems, servers, desktop computers, laptops, tablets, mobile phones or other mobile devices, and/or the like. Accordingly, these client devices 230, 235, 240 may interact with components found within the system architecture 200 either locally or remotely over one or more networks 245. These one or more networks 245 may include, for example, local area networks, wide area networks, public networks, the Internet, cellular networks, Wi-Fi networks, short-range networks (e.g., Bluetooth or ZigBee), and/or the like.

In general, components of the system architecture 200, such as "systems," "servers," "services," "registries," "devices," "clients," "networks" may include electronic computing devices operable to receive, transmit, process, store, or manage data and information. As used in this disclosure, the term "computer," "computing device," "processor," "processor device," or "processing device" is intended to encompass any suitable processing device. For example, components shown as single devices within the architecture 200 may be implemented using a plurality of computing devices and processors, such as server pools comprising multiple server computers.

Further, various components such as the one or more cluster servers 215 and/or microservices 220 may access one or more storage systems (not shown) in which data (e.g., data protection polices) may be stored. Depending on the embodiment, a storage system can include one or more storage units, such as multiple distributed storage units that are connected through a computer network. Each storage unit in the storage system can store at least one of one or more data assets and/or one or more data about the computed properties of one or more data assets. Moreover, each storage unit in the storage system can include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FIG RAM, Millipede memory, racetrack memory, and/or the like.

Exemplary Computing Entity

Figure 3:
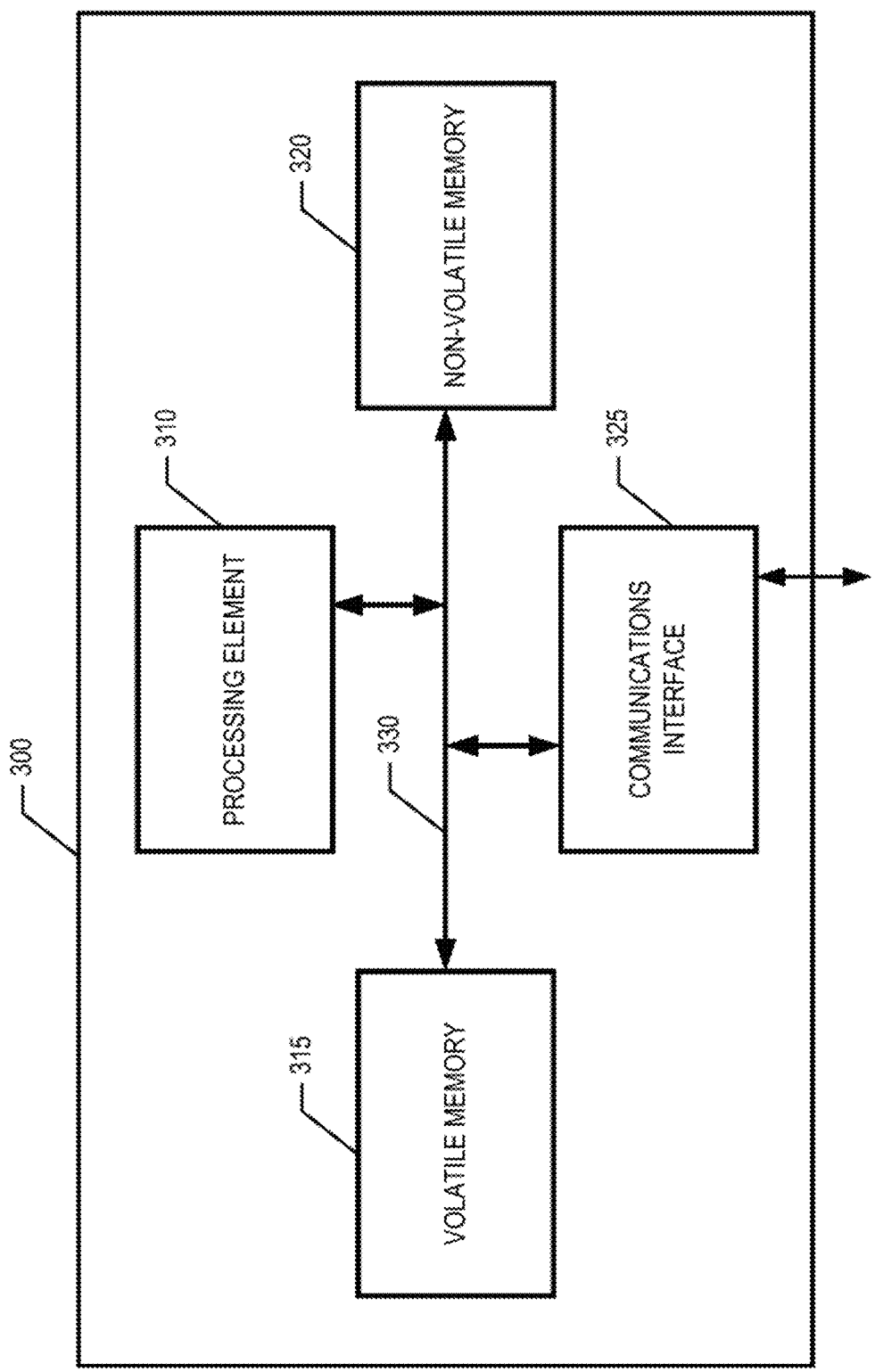
FIG. 3 is a schematic of a computing entity that can be used in conjunction with various embodiments of the present disclosure.

FIG. 3 provides a schematic of a computing entity 300 according to various embodiments of the present disclosure. For instance, the computing entity 300 may be one or more of the cluster servers 215 and/or client devices 230, 235, 240 found within the system architecture 200 previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Data Protection Module

Figure 4:
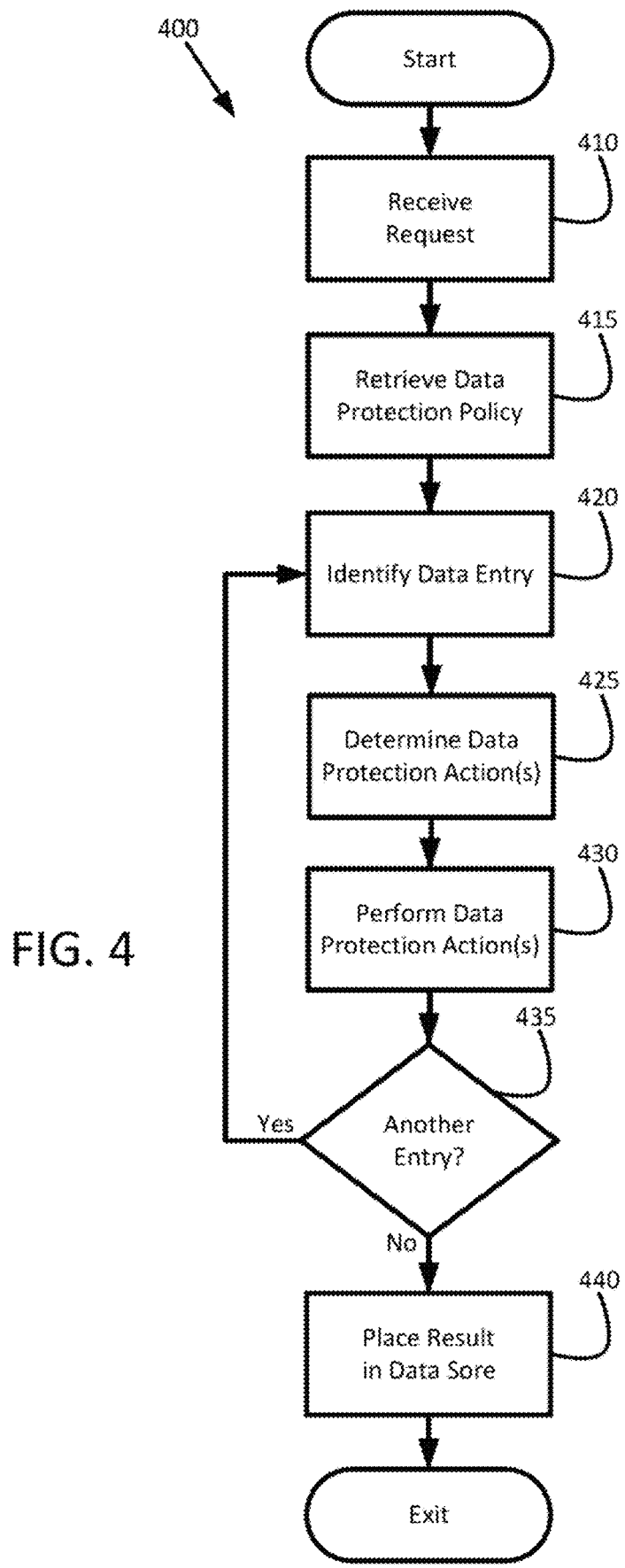
FIG. 4 is a process flow for processing data to perform one or more data protection actions on the data in accordance with various embodiments of the present disclosure.

Turning now to FIG. 4, additional details are provided regarding a process flow for protecting one or more data entries (e.g., attribute(s)) for a request received from a client according to various embodiments. FIG. 4 is a flow diagram showing a data protection module for performing such functionality according to various embodiments of the disclosure. For example, the flow diagram shown in FIG. 4 may correspond to operations carried out by a processing element 310 in one or more computing entities 300, such as a cluster server 215 described in FIG. 2, as it executes the data protection module stored in the computing entities' volatile and/or nonvolatile memory.

As previously discussed, the DPaaS 110 may provide one or more types of data protection. For example, the DPaaS 110 may provide tokenization, de-identification, and/or tagging of data entries, although those of ordinary skill in the art will recognize other types of data protection services can be offered by the DPaaS 110 in light of this disclosure. Therefore, depending on the data protection to be carried out, the data protection module may be, for example, one of the tokenization modules, de-identification modules, or tagging modules as previously described. In addition, the data protection module may be configured to receive a request for one or more data entries for purposes of preforming data protection on the entries from one or more different types of interfaces 115 as previously described.

Therefore, the process flow 400 begins in various embodiments with the data protection module receiving a request in Operation 410. Here, depending on the embodiment, the request may take on various forms as previously described. For example, the data protection module may receive the request as a record read from a topic configured in a messaging system. Here, a client may have written the record to the topic found in the system and the data protection module may then retrieve the record from the topic. The record may include a collection of data having one or more data entries representing sensitive data, along with additional information (e.g., metadata) indicating the one or more applicable data protection policies for the data entries. While in other instances, the data protection module may be configured to identify the applicable policies for the data entries based on the source (e.g., topic) from which the record has been read.

Therefore, the data protection module retrieves the one or more applicable data protection policies for the request in Operation 415. As previously noted, in various embodiments, the data protection module is configured to operate as a microservice within a container. Here, the module may have a version of the different data protection policies within its container and as a result, the module may have access to the applicable data protection policy without having to request the policy from some external resource. Accordingly, in some embodiments, such a configuration may allow for the data protection module to carry out data protection processing on the data entries for the request in near real time. Thus, such a configuration that allows for near real time data protection processing of data entries can provide many clients with a significant advantage in handling sensitive data since such data can be protected almost immediately, minimizing the chances of exposure and lowering clients' vulnerability to liability.

Once the data protection module has retrieved the one or more appropriate data protection policies for the request, the module identifies a data entry for the request that is to be protected in Operation 420. For example, the request may involve a data record that is to be stored in a table of a database. Here, the data record may include three data entries (e.g., fields) that contain sensitive data. For instance, the three data entries may be an individual's legal name, street address, and telephone number. In this example, the data protection module may be configured to preform de-identification on the three data entries to remove any information from the data record that may identify the individual. Therefore, the data protection module may select the individual's name initially from the record based on one or more instructions provided in the applicable data protection policy.

Once selected, the data protection module may then determine the one or more actions to be carried out on the data entry in Operation 425. Therefore, returning to the example, the data protection module may determine that de-identification should be carried out on the individual's name. Here, the data protection module may be configured to determine the action(s) to carry out on the data entry based on the instruction(s) provided by the applicable data protection policy. For example, an instruction found within the data protection policy may indicate the type of de-identification that is to be carried out on the data entry such as masking, generalization, suppression, and/or the like. Accordingly, the data protection module performs the required data protection action(s) on the entry in Operation 430. It is noted that in certain instances, the same action(s) may be carried out on each of the data entries that needed protected in accordance with the request. Therefore, in these particular instances, the data protection module may not need to determine the actions to carry out for each individual data entry.

At this point, the data protection module determines whether another data entry is involved in the request that needs to be protected in Operation 435. If so, then the data protection module returns to Operation 420, selects the next data entry for the request, and performs the operations just described for the newly selected data entry.

Once the data protection module has processed all of the data entries for the request, the data protection module stores the results of performing the data protection on the entries in the data store in Operation 440. As previously noted, that data protection module may carry out this particular operation in various ways depending on the embodiment and the type of interface 115 used by the client to provide the request and/or retrieve the results. For example, the data protection module may place the results into another topic found within the messaging system serving the DPaaS 110 and the results may then be consumed by the client. Thus, the results are returned to the client with the data entries now protected according to the one or more applicable data protection policies. Therefore, in the example, the client can now safely store the record in the table found in the database with the data entries no longer having information identifying the individual.

Sensitive Data Discovery Module

Figure 5:
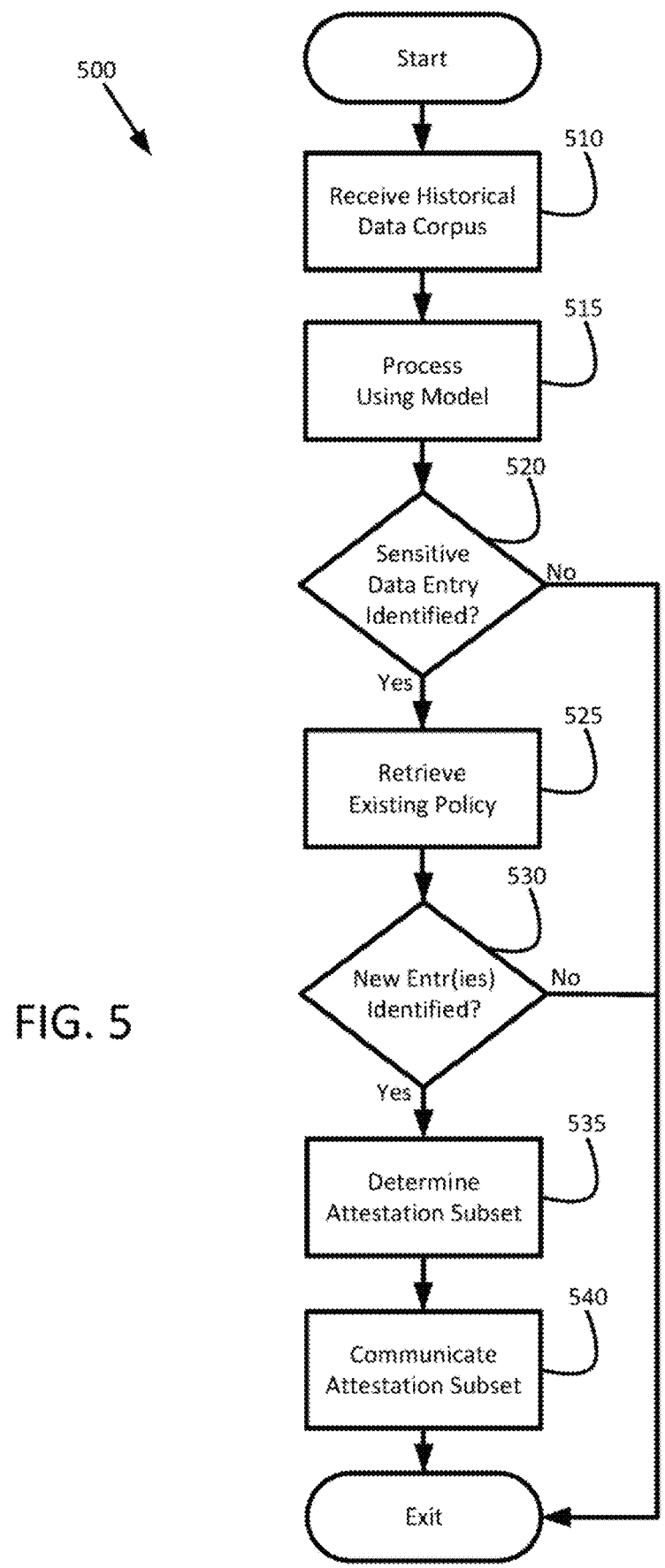
FIG. 5 is a process flow for identifying sensitive data attributes in accordance with various embodiments of the present disclosure.

Turning now to FIG. 5, additional details are provided regarding a process flow for identifying one or more data entries found in a historical data corpus that may represent sensitive data according to various embodiments. FIG. 5 is a flow diagram showing a sensitive data discovery module 165 for performing such functionality according to various embodiments of the disclosure. For example, the flow diagram shown in FIG. 5 may correspond to operations carried out by a processing element 310 in one or more computing entities 300, such as a cluster server 215 described in FIG. 2, as it executes the sensitive data discovery module 165 stored in the computing entities' volatile and/or nonvolatile memory.

As previously noted, the sensitive data discovery module 165 may be tasked with reviewing a historical data corpus for a client to identify any data entries found within the corpus that may represent sensitive data. In particular embodiments, if such entries are identified, then the sensitive data discovery module 165 may initiate a stewardship process that involves sending information on the data entries to the stakeholder (e.g., client) of the corpus to inquire if the identified entries should be protected. Accordingly, if the stakeholder indicates the data entries should be protected, then one or more data protection policies may be updated so that the entries will be protected in any requests received from the stakeholder in the future involving the data entries.

Therefore, the process flow 500 begins with the sensitive data discovery module 165 receiving the historical data corpus in Operation 510. As noted, the historical data corpus may represent a collection of historical data having one or more data entries subject to one or more data protection requirements. Here, the stakeholder (e.g., the client) may have provided the corpus for the purpose of having the corpus reviewed to identify any data entries found within the corpus that may represent sensitive data and thus, may need to be protected. For example, a client may be handling and/or storing medical information for individuals and as part of an audit process, may send the corpus containing historical medical information to the DPaaS 110 to have analyzed.

Accordingly, in various embodiments, the sensitive data discovery module 165 performs an analysis on the historical data corpus by processing the corpus using a data protection policy determination machine learning model to identify any data entries that may represent sensitive data in Operation 515. As previously noted, the data protection policy determination machine learning model may be configured to use the entire corpus, a portion of the corpus, and/or individual data entries as input to identify those entries found in the corpus that may represent sensitive data. For instance, in particular embodiments, the sensitive data discovery module 165 may be configured to scan the corpus to identify new entries and provide the new entries to the data protection policy determination machine learning model as a delimited file, optimized data format such as Parquet or Avro, and/or the like that contains schema/metadata and/or a sample representation of the entries. Accordingly, the data protection policy determination machine learning model then provides output as the whether the new entries may represent sensitive data. For example, in one embodiment, the data protection policy determination machine learning model may generate a data protection attribute model for the historical data corpus. The data protection attribute model may be provided as a vector of values representing one or more of the different (new) data entries found in the corpus in which the value for a data entry provides an indication (e.g., a confidence score identifying a likelihood/probability) of whether the entry represents sensitive data.

Therefore, in Operation 520, the sensitive data discovery module 165 determines whether any of the data entries found in the corpus represent sensitive data. Here, the sensitive data discovery module 165 may be configured to determine whether the likelihood of a particular data entry meets or exceeds a threshold, indicating the entry likely represents sensitive data. If one or more data entries are identified as representing sensitive data, then the sensitive data discovery module 165 retrieves one or more data protection policies that are applicable with respect to the historical data corpus in Operation 525.

For instance, in particular embodiments, the sensitive data discovery module 165 may retrieve the applicable data protection policies from the policy management module 160 previously discussed. Accordingly, the stakeholder who has provided the historical data corpus may have identified the applicable data protection policies for the corpus or the sensitive data discovery module 165 may be configured to determine such applicable data protection policies. For example, the sensitive data discovery module 165 may determine the applicable data protection policies based on the identity of stakeholder who submitted the corpus. Generally speaking, a particular data protection policy may be specific to a particular client.

Thus, the sensitive data discovery module 165 determines whether any of the data entries identified from the corpus that likely represent sensitive data are new entries in Operation 530. That is to say, the sensitive data discovery module 165 in some embodiments determines whether any of the data entries identified from the corpus are not addressed in any of the applicable data protection policies and therefore represent "new" sensitive data entries.

If the sensitive data discovery module 165 determines that at least one of the data entries identified from the corpus is not addressed in any of the applicable data protection policies and therefore represent "new" sensitive data entries, then the sensitive data discovery module 165 in some embodiments produces a dynamic data protection policy update that identifies one or more inferred data protection instructions to address the one or more new attributes identified from the historical data corpus as representing sensitive data. In addition, the sensitive data discovery module 165 determines an attestation subset based on the one or more inferred data protection instructions in Operation 535. Here, the sensitive data discovery module 165 may determine what inferred data protection instructions to include in the attestation subset by comparing the one or more inferred data protection instructions with one or more prior data protection instructions found in the existing data protection policies that are applicable to the data. Thus, in some embodiments, the attestation subset may provide an example of the one or more new data entries identified from the corpus representing sensitive data, along with the one or more inferred data protection instructions for protecting the new entries.

The sensitive data discovery module 165 then communicates the attestation subset to the stakeholder in Operation 540. The sensitive data discovery module 165 performs this particular operation in various embodiments by initiating a stewardship process. The stewardship process is configured to communicate the one or more new data entries identified in the corpus to the stakeholder along with the inferred data protection instructions for protecting the entries. In addition, the stewardship process may provide the stakeholder with information on the existing data protection policies that are applicable so that the stakeholder may make an informed decision on whether the existing policies need to be updated based on the inferred data protection instructions provided in the attestation subset.

For example, in particular embodiments, the DPaaS 110 may be configured to generate some type of attestation user interface to communicate the attestation subset to the stakeholder and to request feedback from the stakeholder as to whether the applicable data protection policies should be updated based on the inferred data protection instructions provided in the subset. For instance, the interface may be a graphical user interface (GUI) that displays the attestation subset to the stakeholder on a client device and requests his or her feedback with respect to the different inferred data protection instructions. While in another instance, the interface may involve sending a communication such as an email detailing the attestation subset and requesting a return email on feedback with respect to the different inferred data protection instructions. Those of ordinary skill in the art can envision other attestation user interfaces that may be used in light of this disclosure to communicate the attestation subset to the stakeholder.

Figure 6:
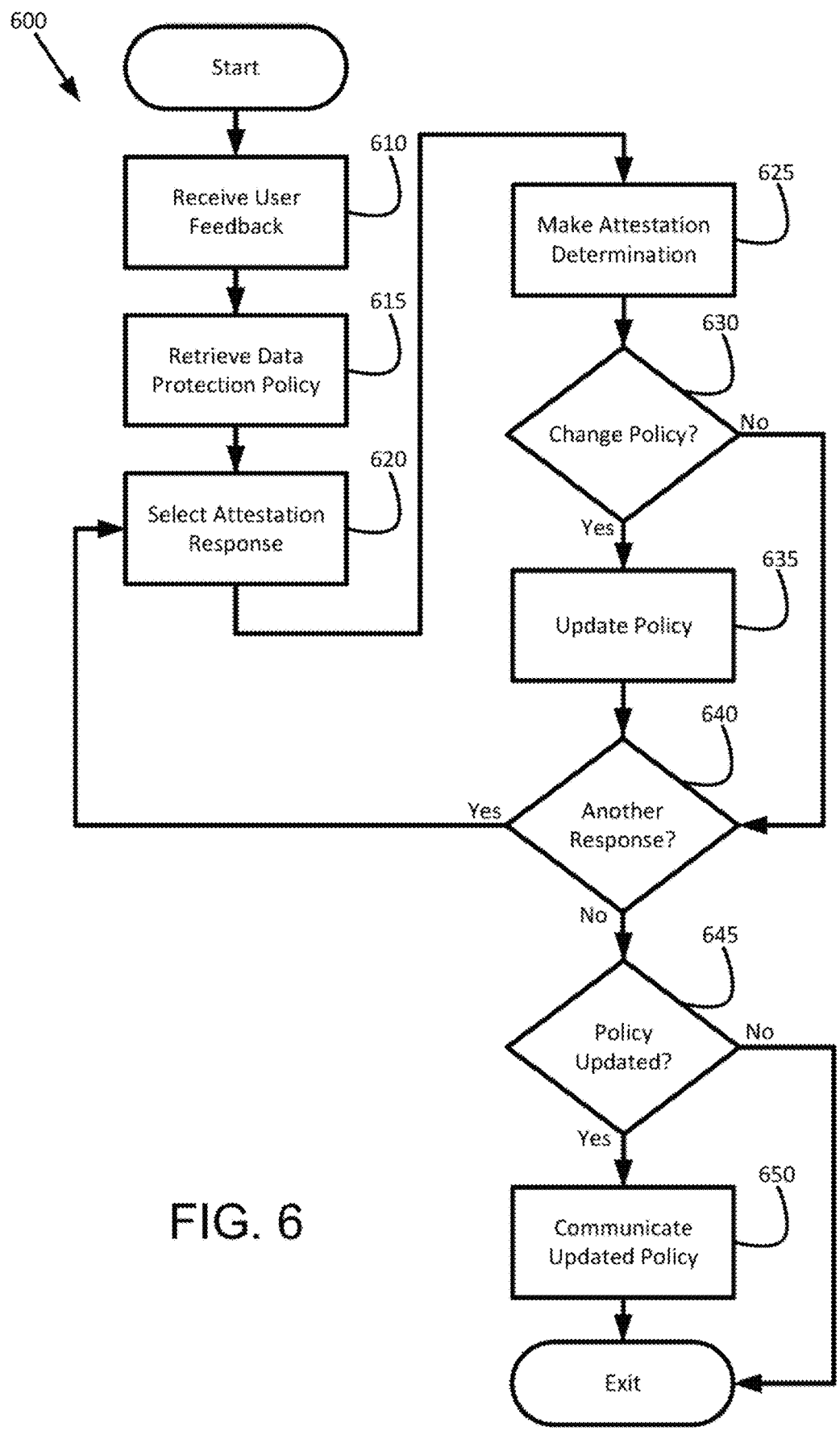
FIG. 6 is a process flow for updating one or more data protection policies in accordance with various embodiments of the present disclosure.

Once the stakeholder has provided feedback, the sensitive data discovery module 165 (or a different module in some embodiments) may receive the feedback and adjust the applicable data protection policies accordingly. Thus, turning now to FIG. 6, the process flow 600 involves the sensitive data discovery module 165 receiving the feedback from the stakeholder in Operation 610. Accordingly, the feedback may provide an indication for each of the inferred data protection instructions provided in the subset as to whether the stakeholder would like to implement the instruction in the appropriate data protection policy. Therefore, the sensitive data discovery module 165 retrieves the applicable data protection policies in Operation 615.

The sensitive data discovery module 165 then selects an attestation response from the feedback for one of the inferred data protection instructions in Operation 620 and makes attestation determination based on the response in Operation 625. The attestation determination may relate to whether to implement the corresponding inferred data protection instruction. Therefore, the sensitive data discovery module 165 determines whether to update the corresponding data protection policy based on reaching an affirmation attestation determination for the corresponding inferred data protection instruction in Operation 630. If the data protection policy is to be updated, then the sensitive data discovery module 165 updates the policy to include the inferred data protection instruction in Operation 635.

At this point, the sensitive data discovery module 165 determines whether a response for another inferred data protection instruction is provided in the feedback in Operation 640. If so, then the sensitive data discovery module 165 returns to Operation 620, selects the next attestation response, and repeats the operations just described for the newly selected response.

Once the responses provided in the feedback have all been processed, the sensitive data discovery module 165 determines whether one or more of the data protection policies have been updated in Operation 645. If so, then the sensitive data discovery module 165 communicates the one or more updated data protection policies in Operation 650. As previously discussed, the communication may involve in various embodiments propagating an updated version of the data protection policies to the containers of the different microservices. As previously noted, each of the containers used for the microservices in some embodiments hosts a version of the data protection policies within the container. Such a configuration allows for the microservice to make use of the different data protection policies without having to make any externals calls or access any external data source. As a result, in various embodiments, a microservice may be able to perform data protection processing on a data entry in near real time.

For instance, in some embodiments, an updated data protection policy may be provided in a repository from which the update policy may be retrieved to update the version of the data protection policy found in each of the containers. Here, once the version of the data protection polices has been updated in the containers for each of the microservices, the container orchestration system may be configured to gradually kill existing containers with the current version of the data protection policies (e.g., images of containers with the current version of the data protection policies) and spin up new containers (e.g., new images) with an updated version of the data protection policies until all the containers are running using the new version. Accordingly, the sensitive data discovery module 165 may be configured to place the updated data protection policies into the repository to initiate the update. While in other instances, the sensitive data discovery module 165 may be configured to provide the updated data protection policies using some other type of mechanism such as an API endpoint.

Integration of Components According to Various Embodiments

Figure 7:
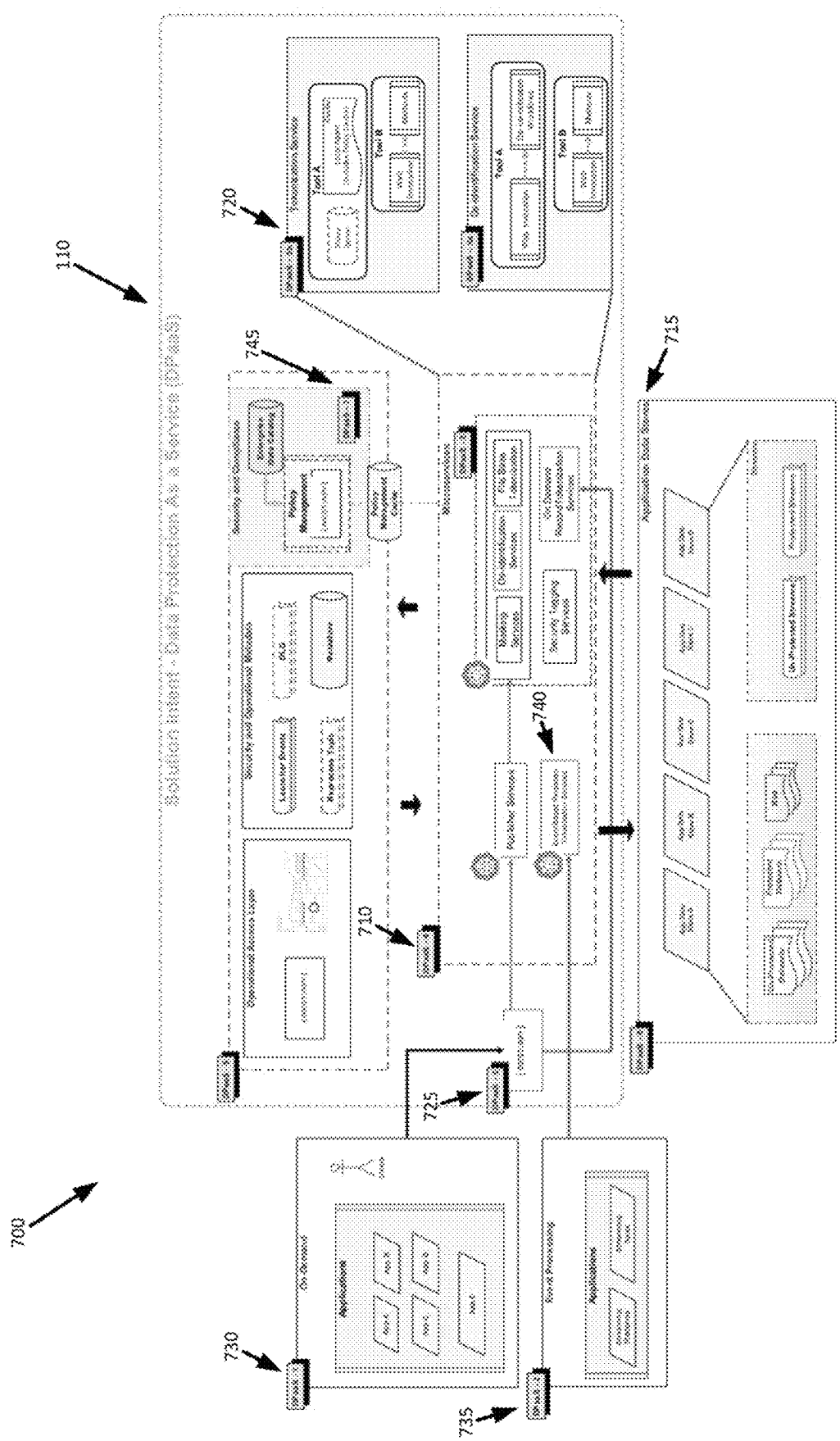
FIG. 7 is a diagram of the integration of different components of the framework in accordance with various embodiments of the present disclosure.

Turning now to FIG. 7, a diagram of an architecture 700 is shown that demonstrates the integration of different components of a DPaaS framework according to various embodiments of the disclosure. The integration of such components in various embodiments facilitates the ability to discover, identify, classify, and/or enforce data protection capabilities and implementations using uniform interfaces. In addition, the flexibility provided by the framework in particular embodiments allows for switching between different technologies to perform different data protection capabilities as described herein.

Accordingly, the DPaaS 110 in various embodiments includes a layer of containerized microservices 710 that are modularized to perform data protection capabilities and apply data protection for various application data stores 715. As depicted in FIG. 7, examples of containerized microservices 710 publisher services, event-based persistent tokenization services 740, masking services, de-identification services, file-based tokenization services, security tagging services, on-demand record tokenization services, and/or the like. Moreover, the containerized microservices 710 may allow for services that are pluggable, in a manner that is configured to simplify the ability to switch between different tools and technologies. For instance, an individual microservice 720 may include in some embodiments tools to facilitate the protection and/or un-protection (i.e., reversable protection) of data entries with minimal overhead. Further, an individual microservice 720 may be scalable across various computing nodes of a computing cluster (e.g., within a cloud platform). Accordingly, such scalability can allow for fault tolerance and redundancy within the DPaaS framework to ensure uninterrupted service.

The DPaaS 110 may also include a REST API layer 725 as a uniform interface to invoke the DPaaS suite of services. Accordingly, the REST API layer 725 may be configured to handle on-demand requests 730 for services. In addition, the REST API layer 725 may be configured in some embodiments to monitor and log DPaaS usage, as well as provide an authentication mechanism.

The containerized microservices 710 are configured in some embodiments to handle requests received via the REST APR layer 725 for both on-demand requests 730 and batch requests, as well as for streaming requests received through an event processing layer 735. In addition, the containerized microservices 710 may include an event-based persistent tokenization service 740 that is configured in some embodiments to protect and/or unprotect data elements (e.g., data entries) on streams.

Further, in particular embodiments, the containerized microservices 710 may make use of a unified mechanism to integrate with a policy management layer 745 to identify the type of policy that needs to be applied. In some embodiments, the policy management layer 745 may serve as an enterprise policy management point for enterprise data controls. The policy management layer 745 may use a repository for data protection policies that is configured to identify data use obligations and/or restrictions, as well as governance of sensitive attributes. Accordingly, as previously detailed, these data protection policies may be propagated to each of the containerized microservices 710 and cached for local use.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for predictive data protection using a data protection policy determination machine learning model, the computer-implemented method comprising:
   processing a historical data corpus, by a computing entity and using the data protection policy determination machine learning model, to generate a dynamic data protection policy update, wherein the dynamic data protection policy update describes one or more inferred data protection instructions;
   determining, by the computing entity, an attestation subset of the one or more inferred data protection instructions by comparing the one or more inferred data protection instructions and one or more prior data protection instructions described by an existing data protection policy;
   for each inferred data protection instruction of the one or more inferred data protection instructions that is in the attestation subset, determining, by the computing entity, a per-instruction attestation determination based on end-user feedback;
   generating an updated data protection policy, by the computing entity, by updating the existing data protection policy in accordance with each inferred data protection instruction of the one or more inferred data protection instructions that both is in the attestation subset and whose per-instruction attestation determination describes an affirmative attestation determination; and
   performing the predictive data protection using the updated data protection policy.

2. The computer-implemented method of claim 1, further comprising:
   identifying a plurality of data protection containers, wherein each data protection container of the plurality of data protection containers is associated with a computing node of a plurality of computing nodes for a computing cluster; and
   providing the updated data protection policy, by the computing entity, to each computing node of the plurality of computing nodes.

3. The computer-implemented method of claim 2, wherein:
   each computing node of the plurality of computing nodes stores a per-container execution logic for the data protection container that is associated with the computing node, a per-container policy version for the data protection container that is associated with the computing node, and a per-container policy update logic for the data protection container that is associated with the computing node,
   providing the updated data protection policy, by the computing entity to a computing node of the plurality of computing nodes, comprises transmitting the updated data protection policy to a communication interface that is associated with the per-container policy update logic for the data protection container that is associated with the computing node,
   each per-container policy update logic that is associated with a computing node of the plurality of computing nodes is configured to update the per-container policy version that is associated with the computing node in accordance with the updated data protection policy, and
   each per-container execution logic that is associated with a computing node of the plurality of computing nodes is configured to perform the predictive data protection with respect to the computing node using the per-container policy version that is associated with the computing node.

4. The computer-implemented method of claim 3, wherein performing the predictive data protection with respect to a computing node of the plurality of computing nodes comprises:
   receiving an input data stream, wherein the input data stream comprises one or more input data entries;
   for each input data entry of the one or more input data entries, processing the input data entry in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and
   performing the predictive data protection with respect to the computing node in accordance with each recommended data protection action of the one or more recommended data protection actions that is associated with an input data entry of the one or more input data entries.

5. The computer-implemented method of claim 3, wherein performing the predictive data protection with respect to a computing node of the plurality of computing nodes comprises:
   receiving an input application programming interface call, wherein the input application programming interface call comprises one or more input data entries;
   for each input data entry of the one or more input data entries, processing the input data entry in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and
   performing the predictive data protection with respect to the computing node in accordance with each recommended data protection action of the one or more recommended data protection actions that is associated with an input data entry of the one or more input data entries.

6. The computer-implemented method of claim 1, wherein determining, by the computing entity, the per-instruction attestation determination for each inferred data protection instruction of the one or more inferred data protection instructions that is in the attestation subset comprises:

generating an attestation user interface that is configured to describe the inferred data protection instruction, wherein the attestation user interface is configured to receive the end-user feedback;

causing the attestation user interface to be displayed on a user computing device;

in response to causing the attestation user interface to be displayed on a user computing device, receiving the end-user feedback from the user computing device; and determining the per-instruction attestation determination based on the end-user feedback.

7. The computer-implemented method of claim 1, wherein performing the predictive data protection comprises:

receiving an input data stream, wherein the input data stream comprises one or more input data entries;

for each input data entry of the one or more input data entries, processing the input data entry in accordance with the updated data protection policy to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection in accordance with each recommended data protection action of the one or more recommended data protection actions that is associated with an input data entry of the one or more input data entries.

8. The computer-implemented method of claim 1, wherein performing the predictive data protection comprises:

receiving an input application programming interface call, wherein the input application programming interface call comprises one or more input data entries;

for each input data entry of the one or more input data entries, processing the input data entry in accordance with the updated data protection policy to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection in accordance with each recommended data protection action of the one or more recommended data protection actions that is associated with an input data entry of the one or more input data entries.

9. An apparatus for predictive data protection using a data protection policy determination machine learning model, the apparatus comprising at least one processor and at least one memory including a computer program code, the at least one memory and the computer program code configured to, with the at least one processor, cause the apparatus to:

process a historical data corpus using the data protection policy determination machine learning model to generate a dynamic data protection policy update, wherein the dynamic data protection policy update describes one or more inferred data protection instructions;

determine an attestation subset of the one or more inferred data protection instructions by comparing the one or more inferred data protection instructions and one or more prior data protection instructions described by an existing data protection policy;

for each inferred data protection instruction of the one or more inferred data protection instructions that is in the attestation subset, determine a per-instruction attestation determination based on end-user feedback; and generate an updated data protection policy by updating the existing data protection policy in accordance with each inferred data protection instruction of the one or more inferred data protection instructions that both is in the attestation subset and whose per-instruction attestation determination describes an affirmative attestation determination, wherein the predictive data protection is performed using the updated data protection policy.

10. The apparatus of claim 9, wherein the at least one memory and the computer program code are configured to, with the at least one processor, cause the apparatus to:

identify a plurality of data protection containers, wherein each data protection container of the plurality of data protection containers is associated with a computing node of a plurality of computing nodes for a computing cluster; and provide the updated data protection policy to each computing node of the plurality of computing nodes.

11. The apparatus of claim 10, wherein:

each computing node of the plurality of computing nodes stores a per-container execution logic for the data protection container that is associated with the computing node, a per-container policy version for the data protection container that is associated with the computing node, and a per-container policy update logic for the data protection container that is associated with the computing node, the at least one memory and the computer program code are configured to, with the at least one processor, cause the apparatus to provide the updated data protection policy to a computing node of the plurality of computing nodes by transmitting the updated data protection policy to a communication interface that is associated with the per-container policy update logic for the data protection container that is associated with the computing node, each per-container policy update logic that is associated with a computing node of the plurality of computing nodes is configured to update the per-container policy version that is associated with the computing node in accordance with the updated data protection policy, and each per-container execution logic that is associated with a computing node of the plurality of computing nodes is configured to perform the predictive data protection with respect to the computing node using the per-container policy version that is associated with the computing node.

12. The apparatus of claim 11, wherein the predictive data protection is performed with respect to a computing node of the plurality of computing nodes by:

receiving an input data stream, wherein the input data stream comprises one or more input data entries;

for each input data entry of the one or more input data entries, processing the input data entry in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection with respect to the computing node in accordance with each recommended data protection action of the one or more recommended data protection actions that is associated with an input data entry of the one or more input data entries.

13. The apparatus of claim 11, wherein the predictive data protection is performed with respect to a computing node of the plurality of computing nodes by:

receiving an input application programming interface call, wherein the input application programming interface call comprises one or more input data entries;

for each input data entry of the one or more input data entries, processing the input data entry in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection with respect to the computing node in accordance with each recommended data protection action of the one or more recommended data protection actions that is associated with an input data entry of the one or more input data entries.

14. The apparatus of claim 9, wherein the at least one memory and the computer program code are configured to, with the at least one processor, cause the apparatus to determine the per-instruction attestation determination for each inferred data protection instruction of the one or more inferred data protection instructions that is in the attestation subset by:

generating an attestation user interface that is configured to describe the inferred data protection instruction, wherein the attestation user interface is configured to receive the end-user feedback;

causing the attestation user interface to be displayed on a user computing device;

in response to causing the attestation user interface to be displayed on a user computing device, receiving the end-user feedback from the user computing device; and determining the per-instruction attestation determination based on the end-user feedback.

15. The apparatus of claim 9, wherein the at least one memory and the computer program code are configured to, with the at least one processor, cause the apparatus to perform the predictive data protection by:

receiving an input data stream, wherein the input data stream comprises one or more input data entries;

for each input data entry of the one or more input data entries, processing the input data entry in accordance with the updated data protection policy to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection in accordance with each recommended data protection action of the one or more recommended data protection actions that is associated with an input data entry of the one or more input data entries.

16. The apparatus of claim 9, wherein the at least one memory and the computer program code are configured to, with the at least one processor, cause the apparatus to perform the predictive data protection by:

receiving an input application programming interface call, wherein the input application programming interface call comprises one or more input data entries;

for each input data entry of the one or more input data entries, processing the input data entry in accordance with the updated data protection policy to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection in accordance with each recommended data protection action of the one or more recommended data protection actions that is associated with an input data entry of the one or more input data entries.

17. A non-transitory computer storage medium comprising instructions for predictive data protection using a data protection policy determination machine learning model, the instructions being configured to cause one or more processors to at least perform operations configured to:

process a historical data corpus using the data protection policy determination machine learning model to generate a dynamic data protection policy update, wherein the dynamic data protection policy update describes one or more inferred data protection instructions;

determine an attestation subset of the one or more inferred data protection instructions by comparing the one or more inferred data protection instructions and one or more prior data protection instructions described by an existing data protection policy;

for each inferred data protection instruction of the one or more inferred data protection instructions that is in the attestation subset, determine a per-instruction attestation determination based on end-user feedback; and generate an updated data protection policy by updating the existing data protection policy in accordance with each inferred data protection instruction of the one or more inferred data protection instructions that both is in the attestation subset and whose per-instruction attestation determination describes an affirmative attestation determination, wherein the predictive data protection is performed using the updated data protection policy.

18. The non-transitory computer storage medium of claim 17, wherein the instructions are configured to cause the one or more processors to at least perform operations configured to:

identify a plurality of data protection containers, wherein each data protection container of the plurality of data protection containers is associated with a computing node of a plurality of computing nodes for a computing cluster; and provide the updated data protection policy to each computing node of the plurality of computing nodes.

19. The non-transitory computer storage medium of claim 18, wherein:

each computing node of the plurality of computing nodes stores a per-container execution logic for the data protection container that is associated with the computing node, a per-container policy version for the data protection container that is associated with the computing node, and a per-container policy update logic for the data protection container that is associated with the computing node, the instructions are configured to cause the one or more processors to at least perform operations configured to provide the updated data protection policy to a computing node of the plurality of computing nodes by transmitting the updated data protection policy to a communication interface that is associated with the per-container policy update logic for the data protection container that is associated with the computing node, each per-container policy update logic that is associated with a computing node of the plurality of computing nodes is configured to update the per-container policy version that is associated with the computing node in accordance with the updated data protection policy, and each per-container execution logic that is associated with a computing node of the plurality of computing nodes is configured to perform the predictive data protection with respect to the computing node using the per-container policy version that is associated with the computing node.

20. The non-transitory computer storage medium of claim 19, wherein the predictive data protection is performed with respect to a computing node of the plurality of computing nodes by:

receiving an input data stream, wherein the input data stream comprises one or more input data entries;

for each input data entry of the one or more input data entries, processing the input data entry in accordance with the per-container policy version that is associated with the computing node to determine one or more recommended data protection actions for the input data entry, wherein: (i) the one or more recommended data protection actions are selected from a plurality of candidate data protection actions, and (ii) the plurality of candidate data protection actions comprises one or more tokenization actions, one or more de-identification actions, and one or more security protocol tagging actions; and performing the predictive data protection with respect to the computing node in accordance with each recommended data protection action of the one or more recommended data protection actions that is associated with an input data entry of the one or more input data entries.

* * * * *